US007045199B2

(12) United States Patent
Yamamoto et al.

(10) Patent No.: US 7,045,199 B2
(45) Date of Patent: May 16, 2006

(54) DRAWABLE AND WRITABLE PHOTO ALBUM

(75) Inventors: Norman Yamamoto, Yorba Linda, CA (US); Xing-Ya Li, San Gabriel, CA (US); Kenneth Lin, San Marino, CA (US); Zhisong Huang, San Dimas, CA (US)

(73) Assignee: Avery Dennison Corporation, Pasadena, CA (US)

(*) Notice: Subject to any disclaimer, the term of this patent is extended or adjusted under 35 U.S.C. 154(b) by 579 days.

(21) Appl. No.: 09/881,134

(22) Filed: Jun. 14, 2001

(65) Prior Publication Data

US 2003/0035932 A1 Feb. 20, 2003

(51) Int. Cl.
*B32B 7/02* (2006.01)

(52) U.S. Cl. .................. 428/213; 428/195.1; 428/220; 428/332; 281/38; 281/40; 281/51; 402/79; 40/124.6; 40/405; 40/124.09; 383/42; 383/56; 383/109

(58) Field of Classification Search ............ 428/195.1, 428/213, 474.5, 220, 332; 156/277; 281/38, 281/40, 51; 402/79; 40/124.6, 124.09; 383/42, 383/56, 109
See application file for complete search history.

(56) References Cited

U.S. PATENT DOCUMENTS

| | | | | |
|---|---|---|---|---|
| 5,030,027 | A | 7/1991 | Bachrach et al. | |
| 5,118,570 | A * | 6/1992 | Malhotra | 428/474.4 |
| D343,862 | S | 2/1994 | Wyant | |
| 5,567,507 | A * | 10/1996 | Paff et al. | 428/213 |
| 5,799,978 | A * | 9/1998 | Grinnell | 281/29 |
| 5,866,312 | A * | 2/1999 | Wang et al. | 430/512 |
| 6,106,015 | A * | 8/2000 | Udwin et al. | 281/29 |
| 6,132,059 | A | 10/2000 | Leibowitz | |
| 6,153,288 | A * | 11/2000 | Shih et al. | 428/195 |
| 6,161,929 | A * | 12/2000 | Erdtmann et al. | 347/101 |
| 6,165,593 | A | 12/2000 | Brault et al. | |
| 6,176,910 | B1 | 1/2001 | Miyazaki et al. | |
| 6,281,291 | B1 * | 8/2001 | Bazaj et al. | 525/218 |
| 6,316,081 | B1 * | 11/2001 | Nelson et al. | 428/195 |

* cited by examiner

*Primary Examiner*—Merrick Dixon
(74) *Attorney, Agent, or Firm*—Fulwider Patton Lee & Utecht, LLP

(57) ABSTRACT

A photo album is provided having an ink-receptive coating on a surface of the photo album. A user may write text or draw pictures on the surface with an ink pen, such as with a gel-based ink pen. The ink-receptive coating protects the ink from smudging or smearing after the ink has dried. Consequently, the text and/or picture is durable. The writable or drawable surface may be the front or back exterior surface, and/or an interior surface.

29 Claims, 3 Drawing Sheets

DRAWABLE AND WRITABLE PHOTO ALBUM

RELATED APPLICATIONS

This is related to U.S. patent application Ser. No. 09/679,938, filed on Oct. 5, 2000 and entitled "Drawable and/or Traceable Carriers," to U.S. patent application Ser. No. 09/607,996, which was filed on Jun. 30, 2000 and entitled, "Drawable and/or Traceable Binders," and to U.S. patent application Ser. No. 09/547,942, filed Apr. 11, 2000, all of which are incorporated by reference herein. This is also related to a patent application entitled, "Ink-Receptive Composition" that is being filed by inventors Xing Ya Li, Kenneth Lin and Zhisong Huang concurrently herewith and which is incorporated by reference.

BACKGROUND

Photo albums are popularly used to store and display photographs. A typical photo album has a front and a back cover, with several interior pages in which to store photos. The cover may be preprinted with text and/or graphics, or may be provided blank.

Photo albums may be bound together in any of a number of different ways. One style of binding is a simple multi-ring binder, such as a standard three-ring binder. Another style of binding is post binding, which utilizes metal posts with screw head holders at either end. A further alternative is strap binding, which holds the pages together using a narrow plastic strip. Other binding methods known in the art are also used.

The covers of most photo albums are made using a turned edge, or case made, construction. A sheet of flexible material is glued to the face of a board. The edge of the material is then "turned," or folded over the edge, and then glued to the back of the board.

The cover is typically made from materials that are durable and water-resistant. One such material is plastic laminated paper, in which a sheet of paper is laminated with a clear plastic sheet to provide water-resistance. Another material is vinyl-coated paper, in which a paper is coated or impregnated with vinyl to provide water-resistance. Another frequently-used material is plastic, such as polypropylene, which is inherently water-resistant.

Because the cover of a typical photo album cover is water-resistant, it is a poor surface on which to write text or draw pictures. Writing or drawing, particularly with ink, is easily smudged or rubbed off. Consequently, most consumers currently do not write or draw on water-resistant photo albums.

SUMMARY OF THE INVENTION

The present invention generally relates to a photo album onto which text and/or graphics can be written with an ink pen. After the text and/or graphics has been written onto the photo album, the ink is not easily smeared or smudged.

In one embodiment, a photo album has a cover with a surface formed from a water-resistant material. An ink-receptive coating is disposed on at least a portion of a surface of the water-resistant material. The coating includes a mixture of a water soluble nonionic polymer, a water soluble amphoteric copolymer and a polyalkylene glycol or silicone surfactant. The photo album also includes sheets for receiving photographs. The cover and sheets for receiving photographs are bound together to form a photo album.

Alternative embodiments may include one or more additional features. The nonionic polymer may be selected from the group consisting of polyvinyl alcohol, water soluble cellulose derivatives, gelatin, and chitosan. The nonionic polymer may comprise a cellulose derivative selected from the group consisting of hydroxyethylcellulose, hydroxypropylcellulose, carboxymethylcellulose, methylhydroxycellulose, and methylhydroxypropyl cellulose. The amphoteric copolymer may be formed from a plurality of monomers comprising about 50 to 90% by weight cationic monomers, about 10 to 30% by weight anionic monomers, and 0 to about 30% by weight neutral monomers.

The plurality of monomers may include about 60 to 80% cationic monomers, about 10 to 20% anionic monomers, and about 10 to 20% neutral monomers. The cationic monomers may be selected from the group consisting of trialkylammoniumalkyl (meth)acrylates, allylalkyl ammonium salts, and vinylbenzylammonium salts. The anionic monomers are selected from the group consisting of (meth)acrylic acid, and acrylamido-2-methylpropane sulfonic acid. The neutral monomers are selected from the group consisting of acrylamide, dialkylaminoalkyl (meth)acrylates, hydroxyalkyl (meth)acrylates, and N-vinyloxazolidone. The amphoteric copolymer may be formed from a plurality of monomers comprising about 60 to 80% dimethylaminoethyl methacrylate methyl chloride quaternary salt, acrylic acid and acrylamido-2-methylpropane sulfonic acid in a combined amount of about 10 to 20%, and about 10 to 20% hydroxyethylmethacrylate.

The nonionic polymer may include a polyvinyl alcohol having a saponification level of about 85 to 95%. The polyalkylene glycol or silicone surfactant may include a polyethylene glycol having a weight-average molecular weight of at least 600. The gel ink-receptive coating further may include a crosslinker. The crosslinker may be, for example, a dialdehyde, glyoxal, or a polyethoxylated dialdehyde.

The ink-receptive coating may further include a pigment. The pigment may include tiny, nano-sized particles. The pigment may include at least one of a colloidal silica and a colloidal alumina hydrate.

Considering further features that may be selectively included in particular embodiments, the nonionic copolymer may include polyvinyl alcohol, the amphoteric copolymer may include a copolymer of trialkylammonimumalkyl (meth)acrylate monomers, acrylic acid, acrylamido-2-methylpropane sulfonic acid, and hydroxyethyl methacrylate, and the polyalkylene glycol or silicone surfactant may include polyethylene glycol.

The mixture may include about 50 to 90% by weight nonionic polymer, about 10 to 50% amphoteric copolymer, and about 1 to 5% polyalkylene glycol or silicone surfactant.

The surface of the cover bearing the ink-receptive coating may include a primer to anchor the ink-receptive coating to the cover. The primer may be, for example, one of an acrylic polymer primer or a polyurethane primer. In one embodiment, the primer is a thin coating of between approximately 0.5–2.0 microns.

The ink-receptive coating may be applied to front and/or back exterior surfaces of the photo album. The coating may optionally be applied to one or both interior surfaces of the photo album, so that the user may write on the interior of the cover. The ink-receptive coating may be applied over an entire surface of the cover, or may be limited to only particular writable areas on the surface of the cover.

Other objects, features, and advantages of the invention will become apparent from a consideration of the following detailed description and from the accompanying drawings.

DETAILED DESCRIPTION OF A PREFERRED EMBODIMENT

Figure 1:
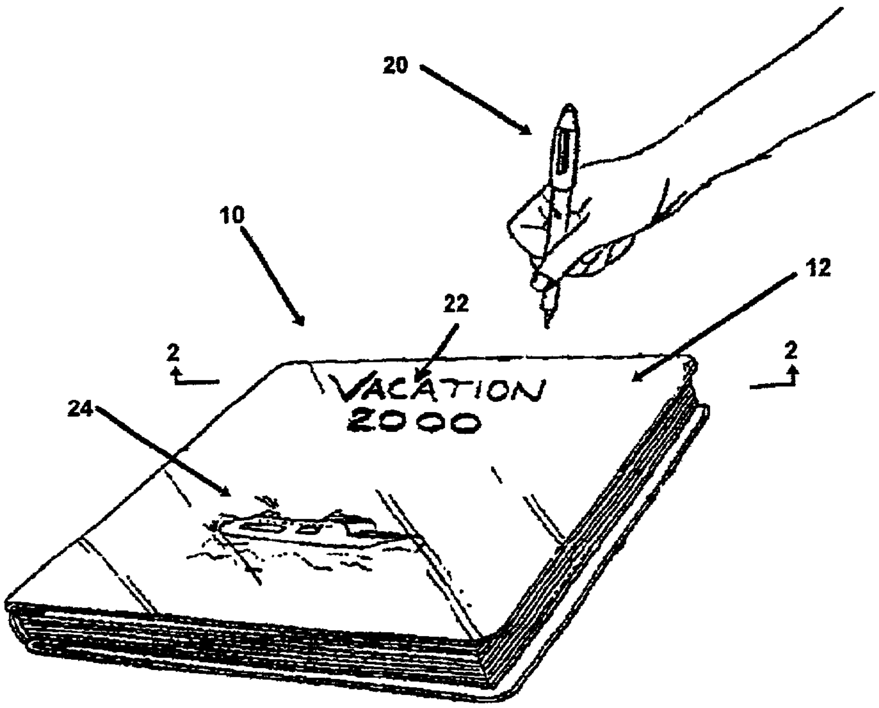
FIG. 1 illustrates a photo album having a cover that is coated with an ink-receptive coating, onto which text and graphics can be drawn.
Figure 2:
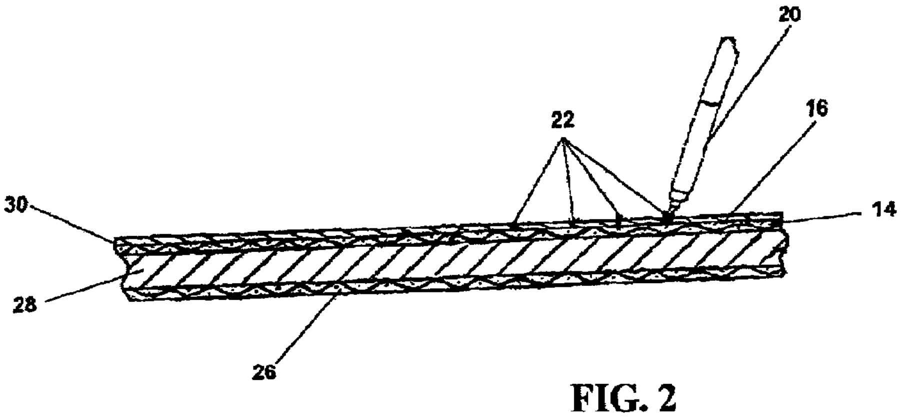
FIG. 2 is a cross-sectional view of the front cover of the photo album.

FIG. 1 illustrates a photo album 10 having a cover 12 with an outer layer 14 (FIG. 2). The outer layer 14 is coated with an ink-receptive coating 16 (FIG. 2) that receives ink from a pen 20. The cover 12 of the photo album 10 is therefor "writable" and "drawable," in that the user may write and draw onto it with a pen.

In FIG. 1, the user has written the words "Vacation 2000" 22 and has drawn a picture of a ship 24. The ink-receptive coating 16 on the outer layer 14 of the cover has received the ink in such a manner that the ink will not easily smear or smudge once it has dried.

In one embodiment of the present invention, the ink-receptive coating is receptive to gel ink, as described in U.S. Pat. No. 5,993,098, entitled "Aqueous Gel-Ink Filled Ball Point Pen," and U.S. Pat. No. 5,993,098, entitled "Ink Composition for Making Pen," as two non-limiting examples. Gel ink pens are known in the art and are widely available. Other embodiments of the ink-receptive coating may be receptive to water-based inks in general. The coating may alternatively be formulated to be receptive to other types of inks, such as solvent-based inks.

FIG. 2 is a cross-section taken about line 2—2 of FIG. 1. The cover 12 has a lower or inner layer 26 and the upper or outer layer 14 of sheet material. The sheet material may be any of a variety of different materials, such as polypropylene, vinyl, vinyl-coated paper, plastic laminated paper or other water-resistant material from which photo albums may be made. A board 12 provides the cover with stiffness. The board 12 may be made from any of a variety of materials, such as chipboard, cardboard, or any material typically used on a photo album cover. The sheet material may be secured to the board 12 by any means known to secure a sheet on a photo album cover.

The upper layer 14 of sheet material is first coated with a primer 30, which may be a very thin layer. An ink-receptive layer 16 is coated onto the primer 30. A user may write onto the ink-receptive layer 16 with a pen 20. Ink marks 22 are all shown having been written onto the ink-receptive layer 16. The ink-receptive coating is formulated to protect the ink after writing, such that the ink does not easily smear or smudge.

The ink-receptive coating may be suitable for receiving gel based ink from gel ink pens. In one embodiment of a clear, gel ink-receptive coating, the coating may comprise 30–100% of water-soluble components and 0–70% of water insoluble pigments. The water soluble components comprise: (1) 60–90% of at least one nonionic water soluble polymer, (2) 2–40% of an amphoteric polymers and (3) up to 10% of various additives. The water-insoluble pigments are nano-sized particles of inorganic or organic materials, for example, colloidal silica, colloidal alumina and emulsion polymers. The nano-sized particles typically have a width of about 100 nanometers or less.

Examples of suitable nonionic water soluble polymers include, but are not limited to, polyvinyl alcohol, polyethyleneoxide, hydroxyethylcellulose, hydroxypropylcellulose, methylhydroxyethylcellulose, methylhydroxypropylcellulose, and gelatin.

The amphoteric polymers are copolymers of (a) 50–90% of at least one cationic vinyl monomer, such as trialkylammoniumalkyl(meth)acrylates, allylalkylammonium salts, vinyl benzylammonium salts; (b) 5–30% of at least one anionic vinyl monomers, such as acrylic acid, methacrylic acid, acrylamido-2-methylpropane sulfonic acid (AMPS), vinyl sulfate and vinyl benzene sulfonate and (c) 0–40% of neutral hydrophilic monomers, such as hydroxyethyl(meth) acrylate, acrylamide, dialkylaminoalkyl(meth)acrylates, N-vinyloxazolidone.

The various additives may include a cross-linking agent, surface-modification agents, dye fixing agents, light fastness-enhancing agents, anti-oxidants, all of which are known in the art.

The water-based formulations of the clear ink-receptive coating, having a solids content of between about 10–40% and a viscosity of 500–10,000 cps, can be coated onto a variety of different substrates by various coating methods, such as roll coating or die coating in single layer or multi-layer constructions. The coat weight typically ranges from approximately 5–20 gram/sq.meter (approximately 5–20 micron thickness).

To enhance the anchorage of the ink receptive coating 16, a surface treatment or a thin primer coating 30 may be applied to the upper and/or lower layers of sheet material 14 and 16. Suitable primers are known in the art. For example, the primer may be an acrylic polymer primer, or a polyurethane primer. The primer coating will typically be very thin and, in one embodiment, is between approximately 0.5–2 microns thick.

Considering now alternative embodiments of an ink-receptive coating, a composition useful for preparing ink-receptive media—in particular, ink-receptive topcoats for ink-jet printers, sheet protectors, transparencies, and other products—comprises a mixture of at least three components: a nonionic, water soluble polymer, preferably selected from the group consisting of polyvinyl alcohol, water soluble cellulose derivatives, gelatin, and chitosan; a second polymer, which is a water soluble amphoteric copolymer; and a surfactant, preferably a water soluble polyalkylene glycol or silicone surfactant. Preferably, the composition also includes a crosslinker and, in some embodiments, a pigment.

In general, ink-receptive compositions according to this embodiment are prepared by mixing the three components at a relative weight ratio of about 50–90% first polymer (nonionic), about 10–50% second polymer (amphoteric), and about 1–5% polyalkylene glycol or silicone surfactant. If too much glycol or surfactant is present, the composition, when coated and dried on a substrate, may exhibit reduced water resistance.

The first polymer is water soluble, or at least hydrophilic, and substantially nonionic. One example is polyvinyl alcohol (PVOH), which comes in a variety of grades and saponification levels (mole percent hydrolysis of polyvinyl acetate). Highly saponified PVOH is preferred, as it is more soluble in water. A preferred PVOH has a saponification level of about 85 to 95%, more preferably about 87 to 89%.

Other examples of water soluble, nonionic polymers include water soluble cellulose derivatives, gelatin, and chitosan. Nonlimiting examples of water soluble cellulose derivatives include hydroxyethylcellulose, hydroxypropylcellulose, carboxy-methylcellulose, methylhydroxycellulose, and methylhydroxypropyl cellulose. It will be apparent to persons skilled in the art that, although the aforementioned polymers contain hydroxyl groups (and, therefore, exhibit a small pKa), they are nonetheless considered to be nonionic polymers.

The second component of the composition is a water soluble, amphoteric copolymer. As used herein, the term "amphoteric" refers to a substance having both cationic and anionic groups within the same molecule. This definition includes molecules that become zwitterionic by adjusting the ambient pH. According to one embodiment of the invention, an amphoteric copolymer is prepared by copolymerizing a mixture of cationic and anionic monomers and, optionally, one or more neutral monomers. The neutral monomers are selected to improve polymer strength or other properties. Preferred monomer weight percentages are as follows: cationic monomers: about 50 to 90% (more preferably about 60 to 80%); anionic monomers: about 10 to 30% more preferably about 10 to 20%); neutral monomers: 0 to about 30% (more preferably about 10 to 20%) based on the weight of all monomers.

Preferred cationic monomers include trialkylammoniumalkyl (meth)acrylates, e.g., dimethylaminioethylmethacrylate methyl chloride quaternary salt (a trimethylammonium chloride available from Ciba Speciality Chemicals, Tarrytown, N.Y., under the trademark "AgeflexFM1Q75MC"); allylalkyl ammonium salts; and vinylbenzylammonium salts. Preferred anionic monomers include (meth)acrylic acid, and acrylamido-2-methylpropane sulfonic acid ("AMPS"). Beta-carboxyethylacrylate (beta-CEA) and itaconic acid are two other examples of anionic monomers. Preferred neutral monomers include acrylamide, dialkylaminoalkyl (meth)acrylates, hydroxyalkyl (meth)acrylates (e.g., hydroxymethyl acrylate, hydroxymethyl methacrylate, hydroxyethyl acrylate, hydroxyethyl methacrylate, hydroxypropyl acrylate, and hydroxypropyl methacrylate), and N-vinyloxazolidone.

A particularly preferred amphoteric copolymer is formed from a plurality of monomers comprising, on a percent by weight basis, about 60 to 80% dimethylaminioethylmethacrylate methyl chloride quaternary salt (e.g., AgeflexFM1Q75MC), about 10 to 20% (combined) acrylamido-2-methylpropane sulfonic acid and acrylic acid, and about 10 to 20% hydroxymethyl acrylate. AMPS is the preferred anionic monomer, but including a small amount of acrylic acid facilitates copolymer crosslinking.

The amphoteric copolymer is prepared using conventional polymerization techniques known to those skilled in the art. Solution polymerization in water is preferred. In general, a plurality of monomers is heated in the presence of a free radical polymerization initiator, optionally by varying the rate of addition of monomers and/or initiator to the reaction mixture. For example, in one embodiment, a reactor is purged with nitrogen, charged with a mixture of monomers and deionized water, and heated to about 45° C. An aqueous solution of one or more initiators is added, with stirring, and polmerization proceeds until complete. Additional initiator can be added to cook-off any residual monomers. If desired, a base is added to adjust the pH of the resulting polymeric composition.

The third component of the composition is, preferably, a water soluble polyalkylene glycol. Nonlimiting examples include polyethylene glycol (PEG) and polypropylene glycol (PPG). Also included are block copolymers of ethylene oxide and propylene oxide, such as the Pluronic and Tetronic surfactants manufactured by BASF. Polyethylene glycols are substantially water-soluble at all molecular weights. Polypropylene glycols, however, become increasingly less water-soluble at molecular weights above 425. Polyethylene glycols are particularly compatible with ink jet printer inks formulated with ethylene glycol. Polyethylene glycols with weight-average molecular weights (Mw) of 600 or higher, more preferably 1000 or higher, are preferred.

In some embodiments, the third component of the composition is a silicone surfactant. A nonlimiting example is Silwet 77, from CK Witco Corporation's Organosilicones Group (Greenwich, Conn.).

In most embodiments, it is preferred to include a crosslinker in the composition, to improve ink-receptivity and waterfastness of the composition and coated constructions prepared therewith. Nonlimiting examples of crosslinkers include dialdehydes, such as glyoxal (O═CHCH═O) and Sequarez 755 (a polyethoxylated dialdehyde from GenCorp (Fairlawn, Ohio)). Preferred crosslinker concentrations are about 0.5 to 3% by weight of the composition.

In some embodiments, a pigment is included in the formulation. Ink-receptive topcoats with high pigment loadings have substantial microporosity, which results in improved water resistance and faster ink drying times. Highly pigmented topcoats (containing, e.g., as much as 60 to 80% by weight pigment) tend to be translucent, or even opaque. If an optically clear topcoat is desired, low pigment concentrations (0 to about 20%) are preferred. In many applications, however, optical clarity is not required. For example, so-called "contact clear" labels are translucent until applied to an envelope or other surface, at which point they look transparent, resulting in a "label-free" appearance.

A nonlimiting example of a highly pigmented ink-receptive composition contains, e.g., 75% pigment, 20% polyvinyl alcohol, 1 to 2% amphoteric copolymer, and 3 to 4% polyethylene glycol, with a small amount (0.5 to 3%) crosslinker. Very small particle size pigments like collodial silica and collodial alumina hydrate are preferred. At such a high pigment loading, little amphoteric copolymer is required. A less pigmented formulation, however, will generally contain substantially more amphoteric copolymer, in order to achieve the desired ink-receptivity.

Ink-receptive compositions are readily prepared by mixing the components using standard blending techniques known to those skilled in the art. In embodiments containing a pigment, it is preferred to add the amphoteric copolymer last, to avoid precipitation.

The composition can be applied to a substrate to prepare an ink-receptive construction according to a second aspect of the invention. In a preferred embodiment, the composition is applied to a substrate using standard coating techniques. Nonlimiting examples include slot-die, air knife, brush, curtain, extrusion, blade, floating knife, gravure, kiss roll, knife-over-blanket, knife-over-roll, offset gravure, reverse roll, reverse-smoothing roll, rod and squeeze roll coating.

Alternatively, the coating may be printed onto the substrate with a flexographic printer or other printing technique, either as a single layer or in multiple layers. The ink-receptive coating may be dried by a dryer associated with a flexographic printing station, or may be dried after printing in a dryer that is separate from the flexographic printer. Methods of drying printed layers of ink-receptive coatings are discussed in a Patent Cooperation Treaty Application filed by Avery Dennison Corporation, International Publication No. WO 99/56682 published on Nov. 11, 1999.

Preferred coat weights are variable and depend on the choice of facestock, the coating method and apparatus used, the desired drying time (both of the coating and ink to be imprinted thereon), and other factors known in the art. A construction with a paper facestock (such as a photo album having a paper cover) can be prepared with an ink-receptive composition coat weight of, e.g., 10 to 20 $g/m^2$ (dry weight). In contrast, a plastic photo album cover may have a much lower coat weight, e.g., 7 to 10 $g/m^2$. Other applications may use substantially higher coat weights.

For paper photo album covers, the composition can be applied using conventional techniques and processes, including coating "on-press" during the converting process (e.g., in concert with the processes of die-cutting, matrix stripping, etc.), coating "off-press" using a separate coater, and other application methods known in the art. After being coated or otherwise applied to a facestock or label stock, the composition is dried at room temperature or, more preferably, at an elevated temperature.

An ink-receptive construction according to the present invention is characterized by a substrate bearing one or more layers, including an outermost layer of a glossy topcoat comprising a composition as described above. Useful photo album substrates include, without limitation, plastic film, especially transparent film, as well as paper, cardboard, corrugated board, metal film or foil, and other facestocks traditionally used for photo album covers.

Nonlimiting examples of plastic facestocks include polyester, polystyrene, polyvinyl chloride, nylon, and polyolefin (for example, polyethylene) films as well as polymer blends. The films may be cast, extruded, or coextruded. In some embodiments, film facestocks may be pre-treated with a primer or treated with a corona discharge to improve coating anchorage to the film.

Nonlimiting examples of paper facestocks include offset, bond, text, cover, index, lightweight printing paper, litho paper and sulfite paper.

The writable surface could potentially be applied to the cover of a photo album in the form of a self-adhesive label. Label stocks include, without limitation, a variety of printable label constructions or assemblies well known in the art, each typically comprising a label facestock (sheet or roll) having at least one inner and at least one outer surface, a pressure-sensitive adhesive (PSA) adhered to at least one inner surface of the label facestock, and a removable release liner protecting the PSA until use, the entire assembly forming a sandwich-like construction.

Figure 3:
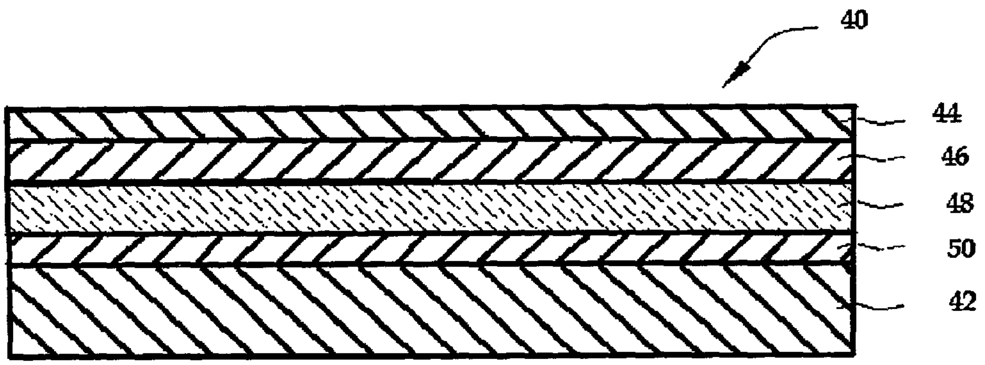
FIG. 3 is a detailed, cross-sectional view of a substrate for covering a photo album, in which a writable surface of the substrate includes a plurality of layers.

A further alternative embodiment of an ink-receptive construction according to the present invention is schematically illustrated in FIG. 3, which is a detailed view of a cross-section of a coated sheet material that can be used to cover a photo album. The cover stiffener and other aspects of the photo album are not illustrated in FIG. 3. The construction 40 has a multilayer, sandwich-like structure in which several layers are coated on or laminated to a facestock 42, in the order shown. A glossy topcoat 44 comprising an ink-receptive composition as described herein is highly hydrophilic, preferably water swellable, but not water soluble. Aqueous inks can pass quickly through the topcoat but will not wash away or loose gloss when contacted with water or aqueous solutions. Preferably the topcoat layer is made as thin as possible.

An ink receiving and fixing layer 46 is comprised of a material capable of fixing the dyes in the ink, while allowing excess water to pass through the layer. For example, water soluble polymers containing one or more cationic functional groups, and/or other ingredients can be used as an ink-receiving and fixing layer. Where the multilayer construction is to be used with colored inks, it is preferred that layer 46 be substantially thick enough to accommodate all of the dies in the ink (e.g., cyan, magenta, yellow, and black) but not so thick that color is concentrated in a thin layer near the surface. Preferably, layer 46 is as clear as possible.

The water absorbent layer 48 is comprised of a highly porous material and can instantly absorb the water in an ink, without swelling. Non-limiting examples include microporous pigments and hollow microspheres. Preferably, the material has a high opacity and reflects light well. Non-limiting examples include collodial alumina oxide, silica, zeolites, hollow microsphere polystrene, and hollow microsphere glass. Even water soluble materials can be used, as long as a crosslinker is included, so that upon crosslinking, layer 48 will not wash away. Alternatively, a water swellable, hydrophilic emulsion polymer can be used.

A water resistant layer 50 will stop water based inks from penetrating into the facestock 42, allowing paper substrates to be used. As discussed previously, the layer 50 may be a clear plastic sheet that is adhered to the facestock 42 to provide water-resistance. Alternatively, the layer 50 may be a vinyl coating, in which the facestock 42 is coated or impregnated with vinyl to provide water-resistance. Other water-resistant layers known in the art may be used including, for example, layers that are coated or printed onto the facestock 42, such as a UV curable varnish. The water-resistant layer 50 ensures that the quality of the ink image will not be affected by the structure of the facestock 42. Preferably, most of the ink in an imprinted image will reside in the topcoat layer to provide a high color density and sharp image.

The substrate 42 can be any sheet material, including paper, plastic film, and the like, with flexible materials being preferred.

A multilayer construction as shown in FIG. 3 is designed to facilitate formation of a sharp, high color density image, with a glossy photograph-like appearance. Although not bound by theory, it is believed that an ink drop will quickly pass through the topcoat layer 20 into the ink receiving and fixing layer 30 where most of the dyes in the ink will be fixed by the active ingredients contained in the ink receiving and fixing layer. Excess water and remaining dyes are believed to go further into the structure and be absorbed by the water absorbent layer 40 and stopped by the water resistant layer 50.

EXAMPLES

The following are nonlimiting examples of amphoteric copolymers, ink-receptive compositions, and coated substrates prepared in accordance with the invention. The following abbreviations and product names are used in the tables:

| Monomers | |
|---|---|
| HEMA | Hydroxyethyl methacrylate |
| AA | Acrylic Acid |
| AMPS ® 2405 | Acrylamido-2-methylpropane sulfonic acid, sodium salt (50% aqueous solution), from Lubrizol Corp. |

-continued

| | |
|---|---|
| AgeflexFM1Q75MC | Dimethylaminoethylmethacrylate methyl chloride quaternary salt, from Ciba Specialty Chemicals |
| Polymers | |
| Airvol ® 540 | Polyvinyl alcohol (87–89% hydrolysis), from Air Products and Chemicals, Inc. |
| Klucel-L | Hydroxypropylcellulose (10% aqueous solution), from Hercules, Inc. |
| Gantrez ® A-425 | Copolymer of methyl vinyl ether and maleic acid mono-butyl ester (50% ethanol solution), from International Specialty Products |
| Polymer 1 | Amphoteric copolymer according to Example 1 |
| Polymer 2 | Amphoteric copolymer according to Example 2 |
| Pigments | |
| ST-PS-M | "Snowtex" colloidal silica (aqueous dispersion), from Nissan Chemical Industries, Ltd. |
| MA-ST-UP | "Snowtex" colloidal silica (methanol dispersion), from Nissan Chemical Industries, Ltd. |
| Aluminasol #1 | Colloidal alumina hydrate (aqueous dispersion), from Nissan Chemical Industries, Ltd. |
| Glycols and Surfactants | |
| Carbowax 4600 | Polyethylene glycol ($M_w \approx 4600$), from Union Carbide |
| Tetronic ® 1102 | Block copolymer of ethylene oxide and propylene oxide, from BASF |
| Silwet 77 | Silicone surfactant, from CK Witco Corporation |
| Crosslinkers | |
| Sequarez 755 | Polyethoxylated dialdehyde, from GenCorp |
| Glyoxal | O═CHCH═O |

-continued

| | |
|---|---|
| Other | |
| DI $H_2O$ | Deionized Water |

Examples 1–3

Amphoteric Copolymers

Using the monomers, initiators, and other components listed in Table 1, three amphoteric copolymers were prepared by free radical polymerization in water. In each case a reactor equipped with a thermometer, stirrer, and condenser was purged with nitrogen, charged with monomers and deionized water, and heated to 45° C. Under stirring, a reactor charge (RC) initiator was added in two steps: first (NH4)2S2O8 in water, then Na2S2O5 in water. The reactor temperature rose to 60–65° C. in about 10 minutes, and was then kept at 65–70° C. for two hours, under nitrogen. A cook-off initiator was added to polymerize any residual monomers. The reactor was kept at 65–70° C. for one hour, and then allowed to cool. In Example 3, a base (sodium bicarbonate) was added after polymerization to raise the pH of the polymer solution.

TABLE 1

Amphoteric Coplymers: Examples 1–3

| Reactor Charge | Example 1 | | | | Example 2 | | | | Example 3 | | | mol |
|---|---|---|---|---|---|---|---|---|---|---|---|---|
| Monomer mix | mass (g) | active (g) | wt % | mol % | mass (g) | active (g) | wt. % | mol % | mass (g) | active (g) | wt. % | % |
| HEMA | 0.0 | 0.0 | 0.0 | 0.0 | 20.0 | 20.0 | 10.0 | 15.7 | 20.0 | 20.0 | 10.0 | 16.3 |
| AA | 10.0 | 10.0 | 10.0 | 24.3 | 8.0 | 8.0 | 4.0 | 10.0 | 4.0 | 4.0 | 2.0 | 5.2 |
| AMPS 2405 (50%) | 40.0 | 20.0 | 20.0 | 16.9 | 40.0 | 20.0 | 10.0 | 8.7 | 32.0 | 16.0 | 8.0 | 7.2 |
| AgeflexFM1Q75MC | 93.3 | 70.0 | 70.0 | 58.8 | 202.7 | 152.0 | 76.0 | 65.6 | 213.3 | 160.0 | 80.0 | 71.4 |
| total monomers | 143.3 | 100 | 100% | 100% | 270.7 | 200 | 100% | 100% | 269.3 | 200 | 100% | 100% |
| DI $H_2O$ | 100 | | | | 260 | | | | 260 | | | |
| RC Initiator | | | | | | | | | | | | |
| $(NH_4)_2S_2O_8$ | 0.050 | | 0.0002 | | 0.100 | | 0.05% | | 0.100 | | 0.05% | |
| $H_2O$ | 5.0 | | | | 10.0 | | | | 10.0 | | | |
| $Na_2S_2O_5$ | 0.021 | | 0.0001 | | 0.042 | | | | 0.042 | | | |
| $H_2O$ | 5.0 | | | | 10.0 | | | | 10.0 | | | |
| Cook-off initiator | | | | | | | | | | | | |
| $(NH_4)_2S_2O_8$ | 0.050 | | 0.0002 | | 0.100 | | 0.05% | | 0.100 | | 0.05% | |
| $H_2O$ | 5.0 | | | | 30.0 | | | | 50.0 | | | |
| $Na_2S_2O_5$ | 0.021 | | 0.0001 | | 0.042 | | | | 0.042 | | | |
| $H_2O$ | 5.0 | | | | 30.0 | | | | 50.0 | | | |
| total reaction | 263.4 | | | | 610.9 | | | | 649.6 | | | |
| total solids | | | 38.0% | | | | 32.8% | | | | 30.8% | |
| Base Solution | None | | | | None | | | | | | | |
| $H_2O$ | | | | | | | | | 100.0 | | | |
| $NaHCO_3$ | | | | | | | | | 4.20 | | | |
| Additional $H_2O$ | | | | | | | | | 100.0 | | | |
| Final Volume | | | | | | | | | 849.6 | | | |
| Final Solids | | | | | | | | | 23.5% | | | |

Examples 4–14

Ink-receptive Compositions

Using the components listed in Table 2, ink-receptive compositions were prepared by blending the components together, with stirring. Examples 4–6 are comparative examples, as they lack an amphoteric polymer and/or a polyalkylene glycol or silicone. In each of examples 7–14, the amphoteric polymer was added last, to avoid precipitation.

TABLE 2

Ink Receptive Compositions: Ex. 4–14

| Component | amount (g) | active % | active (g) | weight % |
|---|---|---|---|---|
| | | Ex. 4 | | |
| Airvol540 | 20 | 11.6% | 2.32 | 25.3% |
| ST-PS-M | 32 | 21.0% | 6.72 | 73.4% |
| Sequarez755 | 0.6 | 20.0% | 0.12 | 1.31% |
| Total | 52.60 | 17.4% | 9.16 | 100.0% |
| | | Ex. 5 | | |
| Airvol540 | 20 | 11.6% | 2.32 | 23.7% |
| Aluminasol#1 | 38 | 19.2% | 7.30 | 74.6% |
| Silwet77 | 0.04 | 100.0% | 0.04 | 0.41% |
| Sequarez755 | 0.6 | 20.0% | 0.12 | 1.23% |
| Total | 58.64 | 16.7% | 9.78 | 100.0% |
| | | Ex. 6 | | |
| Gantrez A425 | 12 | 50.0% | 6.00 | 33.3% |
| MA-ST-UP | 80 | 15.0% | 12.00 | 66.7% |
| Total | 92.00 | 19.6% | 18.00 | 100.0% |
| | | Ex. 7 | | |
| Airvol540 | 25.9 | 11.6% | 3.00 | 30.0% |
| Polymer 1 | 0.6 | 23.5% | 0.15 | 1.5% |
| Aluminasol#1 | 34.9 | 19.2% | 6.70 | 67.0% |
| Silwet77 | 0.050 | 100.0% | 0.05 | 0.50% |
| Sequarez755 | 0.500 | 20.0% | 0.10 | 1.00% |
| Total | 61.95 | 16.1% | 10.00 | 100.0% |
| | | Ex. 8 | | |
| Aluminasol#1 | 7.0 | 19.2% | 1.34 | 10.00% |
| Airvol540 | 69.3 | 9.1% | 6.31 | 47.00% |
| Carbowax460 | 0.83 | 40.0% | 0.33 | 2.50% |
| Sequarez755 | 0.33 | 20.0% | 0.07 | 0.50% |
| Polymer 1 | 22.8 | 23.5% | 5.36 | 40.00% |
| Total | 100.26 | 13.4% | 13.41 | 100.00% |
| | | Ex. 9 | | |
| Aluminasol#1 | 7.0 | 19.2% | 1.34 | 10.10% |
| Airvol540 | 83.6 | 9.1% | 7.61 | 57.00% |
| Carbowax460 | 0.82 | 40.0% | 0.33 | 2.50% |
| Sequarez755 | 0.33 | 20.0% | 0.07 | 0.50% |
| Polymer 1 | 17.0 | 23.5% | 4.00 | 29.90% |
| Total | 108.75 | 12.3% | 13.34 | 100.00% |
| | | Ex. 10 | | |
| Aluminasol#1 | 7.0 | 19.2% | 1.34 | 10.00% |
| Airvol540 | 77.5 | 11.6% | 8.99 | 67.00% |
| Carbowax460 | 0.83 | 40.0% | 0.33 | 2.50% |
| Sequarez755 | 0.33 | 20.0% | 0.07 | 0.50% |
| Polymer 1 | 11.4 | 23.5% | 2.68 | 10.00% |
| Total | 97.06 | 13.8% | 13.41 | 100.00% |
| | | Ex. 11 | | |
| Aluminasol#1 | 7.0 | 19.2% | 1.34 | 10.00% |
| Airvol540 | 87.5 | 11.8% | 10.33 | 77.00% |

TABLE 2-continued

Ink Receptive Compositions: Ex. 4–14

| Component | amount (g) | active % | active (g) | weight % |
|---|---|---|---|---|
| Carbowax460 | 0.83 | 40.0% | 0.33 | 2.50% |
| Sequarez755 | 0.33 | 20.0% | 0.07 | 0.50% |
| Polymer 1 | 5.7 | 23.5% | 1.34 | 10.00% |
| Total | 101.36 | 13.2% | 13.41 | 100.00% |
| | | Ex. 12 | | |
| Aluminasol#1 | 22.0 | 19.2% | 4.22 | 10.10% |
| Airvol540 | 285.0 | 9.6% | 27.36 | 65.60% |
| Carbowax460 | 2.49 | 40.0% | 1.00 | 2.40% |
| Sequarez755 | 1.15 | 20.0% | 0.23 | 0.60% |
| Polymer 1 | 37.8 | 23.5% | 8.88 | 21.30% |
| Total | 348.44 | 12.0% | 41.69 | 100.00% |
| | | Ex. 13 | | |
| Airvol540 | 74.0 | 9.3% | 6.88 | 63.90% |
| Klucel-L | 16.0 | 10.0% | 1.60 | 14.90% |
| Polymer 2 | 7.6 | 28.0% | 2.13 | 19.80% |
| Tetronic1102 | 0.11 | 100.0% | 0.11 | 1.00% |
| $H_2O$ | 0.0 | 0.0% | 0.00 | 0.00% |
| Sequarez755 | 0.27 | 20.0% | 0.05 | 0.50% |
| Total | 97.98 | 11.0% | 10.77 | 100.10% |
| | | Ex. 14 | | |
| Airvol540 | 124.0 | 9.0% | 11.41 | 65.20% |
| Polymer 2 | 17.5 | 28.0% | 4.90 | 28.00% |
| Tetronic1102 | 0.51 | 100.0% | 0.51 | 2.90% |
| Carbowax4600 | 0.49 | 100.0% | 0.49 | 2.80% |
| $H_2O$ | 5.0 | 0.0% | 0.00 | 0.00% |
| Sequarez755 | 0.88 | 20.0% | 0.18 | 1.00% |
| Total | 148.38 | 11.8% | 17.49 | 99.90% |

Ink-receptive Compositions

Paper and film substrates can be coated with an ink-receptive composition (e.g., Examples 4–12) to prepare an ink-receptive construction. Polymer crosslinking is readily accomplished by drying the coated substrate for 5 minutes at 170 to 190° F. The crosslinked, topcoated construction can then be imaged in a printer (e.g., an ink jet printer) and evaluated for image quality, ink drying time, waterfastness, and other properties. Preliminary tests reveal that ink-receptive constructions prepared with Examples 7–12 are superior to Examples 4–6 in image quality and waterfastness.

Concerning further alternative ink-receptive coatings that may be used to receive aqueous, solvent based and/or gel based ink, one such coating is disclosed in PCT Publication Number WO 99/04981, entitled “Ink Receptive Coatings and Coated Products.” This coating includes a pigment disposed in or mixed with a binder which may be an ethylene-vinyl acetate emulsion polymer and a water soluble cationic polymer. Other coatings which are receptive to all three types of ink and which are substantially water-fast are disclosed in U.S. Pat. No. 4,613,525, granted Sep. 23, 1986; European Patent Application No. 0 199 874, published Nov. 5, 1986; PCT Publication No. WO 97/01448, published Jan. 16, 1997; European Patent Specification EP 0 655 346 B1, published May 31, 1995; and PCT Publication No. WO 96/18496, published Jun. 20, 1996. These references generally relate to coatings for use with sheets used with ink jet printers, with the ink jet printers applying the water based ink to individual sheets of coated paper which may be fed one by one through the printers.

This coating may advantageously include a porous pigment such as silica gel, in a binder which includes as one component a water soluble polymer. It is believed that the ink is absorbed into the coating via the soluble polymer and penetrates the pores of the pigment, thus producing a clear image wherein the carrier for the ink (water or solvent) brings the ink color to penetrate the pores of the finely divided pigment of the coating.

In closing, the foregoing detailed description and drawing relate to preferred embodiments of the invention. However, it is to be understood that various modifications can be made without departing from the spirit and scope of the invention. For example, both the front and back covers may have the ink-receptive coating. Interior surfaces of the front and/or back covers may also be coated with the ink-receptive coating, to allow multiple areas onto which the consumer may write text and/or draw pictures with an ink pen. The front and/or back covers may be fully covered on the exterior and/or interior surfaces with the ink receptive coating, or the coating can be applied in certain portions of the cover. For example, referring to FIG. 1, the coating may be provided in the area on which the ship 24 is drawn and in the area where the words "Vacation 2000" are drawn, but not on other areas of the front of the cover. In that way, limited predefined ink-receptive areas may be provided in specific areas of the cover.

The album may be bound in any manner known for binding photo albums, and is not limited to the binding method that is illustrated in FIG. 1. Accordingly, the present invention is not limited to the embodiments described in detail hereinabove and shown in the drawings.

It is also to be understood that the attached figures are not production drawings. The relative dimensions of the coatings and other aspects of the embodiments are drawn for illustration purposes only, and are not intended to precisely illustrate the relative dimensions.

What is claimed is:

1. A photo album comprising: a cover having a surface formed from a water-resistant material; an ink-receptive coating disposed on at least a portion of a surface of said water-resistant material, said coating comprising a mixture of a water soluble nonionic polymer; a water soluble amphoteric copolymer; and a polyalkylene glycol or silicone surfactant; and sheets for receiving photographs, said cover and sheets for receiving photographs being interconnected together to form a photo album; wherein the ink-receptive coating protects ink that has been written onto said cover from smudging or smearing after the ink has dried.

2. A photo album as recited in claim 1, wherein the nonionic polymer is selected from the group consisting of polyvinyl alcohol, water soluble cellulose derivatives, gelatin, and chitosan.

3. A photo album as recited in claim 1, wherein the nonionic polymer comprises a cellulose derivative selected from the group consisting of hydroxyethylcellulose, hydroxypropylcellulose, carboxymethylcellulose, methylhydroxycellulose, and methylhydroxypropylcellulose.

4. A photo album as recited claim 1, wherein the amphoteric copolymer is formed from a plurality of monomers comprising about 50 to 90% by weight cationic monomers, about 10 to 30% by weight anionic monomers, and 0 to about 30% by weight neutral monomers.

5. A photo album as recited in claim 4, wherein the plurality of monomers comprises about 60 to 80% cationic monomers, about 10 to 20% anionic monomers, and about 10 to 20% neutral monomers.

6. A photo album as recited in claim 4, wherein the cationic monomers are selected from the group consisting of trialkylammoniumalkyl (meth)acrylates, allylalkyl ammonium salts, and vinylbenzylammonium salts.

7. A photo album as recited in claim 4, wherein the anionic monomers are selected from the group consisting of (meth)acrylic acid and acrylamido-2-methylpropane sulfonic acid.

8. A photo album as recited in claim 4, wherein the neutral monomers are selected from the group consisting of acrylamide, dialkylaminoalkyl (meth)acrylates, hydroxyalkyl (meth)acrylates, and N-vinyloxazolidone.

9. A photo album as recited in claim 1, wherein the amphoteric copolymer is formed from a plurality of monomers comprising about 60 to 80% dimethylaminoethyl methacrylate methyl chloride quaternary salt; acrylic acid and acrylamido-2-methylpropane sulfonic acid in a combined amount of about 10 to 20%; and about 10 to 20% hydroxyethylmethacrylate.

10. A photo album as recited in claim 1, wherein the nonionic polymer comprises a polyvinyl alcohol having a saponification level of about 85 to 95%.

11. A photo album as recited in claim 1, wherein the polyalkylene glycol or silicone surfactant comprises a polyethylene glycol having a weight-average molecular weight of at least 600.

12. A photo album as recited in claim 1, in which the gel ink-receptive coating further comprises a crosslinker.

13. A photo album as recited in claim 12, wherein the crosslinker is a dialdehyde.

14. A photo album as recited in claim 13, wherein the crosslinker is glyoxal.

15. A photo album as recited in claim 13, wherein the crosslinker is a polyethoxylated dialdehyde.

16. A photo album as recited in claim 1, wherein said ink-receptive coating further comprises a pigment.

17. A photo album as defined in claim 16, wherein said pigment comprises nano-sized particles.

18. A photo album as recited in claim 17, wherein the pigment comprises at least one of a colloidal silica and a colloidal alumina hydrate.

19. A photo album as recited in claim 1, wherein the nonionic copolymer comprises polyvinyl alcohol, the amphoteric copolymer comprises a copolymer of trialkylammonimumalkyl (meth)acrylate monomers, acrylic acid, acrylamido-2-methylpropane sulfonic acid, and hydroxyethyl methacrylate, and the polyalkylene glycol or silicone surfactant comprises polyethylene glycol.

20. A photo album as recited in claim 1, wherein the mixture comprises about 50 to 90% by weight nonionic polymer, about 10 to 50% amphoteric copolymer, and about 1 to 5% polyalkylene glycol or silicone surfactant.

21. A photo album as defined in claim 1, wherein said ink-receptive coating is clear.

22. A photo album as defined in claim 4, wherein the coat weight of the ink-receptive coating is approximately 5–20 gram/sq.meter.

23. A photo album as defined in claim 1, wherein said ink-receptive coating is also receptive to water-based and solvent-based inks.

24. A photo album as defined in claim 1, wherein a primer is disposed on the surface of the cover.

25. A photo album as defined in claim 24, wherein said primer is one of an acrylic polymer primer or a polyurethane primer.

26. A photo album as defined in claim 25, wherein said primer is between approximately 0.5–2.0 microns thick.

27. A photo album comprising: a front cover having an exterior surface formed from a water-resistant sheet material, an interior surface, and a stiffener in between said exterior surface and said interior surface; a back cover having an exterior surface formed from a water-resistant sheet material, an interior surface, and a stiffener in between said exterior surface and said interior surface; an ink-receptive coating disposed on at least a portion of an exterior surface of said water-resistant material, said coating comprising a mixture of a water soluble nonionic polymer, a water soluble amphoteric copolymer, and a polyalkylene glycol or silicone surfactant; and sheets for receiving photographs, said front cover, back cover, and sheets for receiving photographs being interconnected together to form a photo album; wherein the ink-receptive coating protects ink that has been written onto said cover from smudging or smearing after the ink has dried.

28. A photo album as defined in claim 27, wherein the covers have a turned-edge construction.

29. A photo album as defined in claim 27 wherein the entire exterior surface of at least one of the covers is covered with said ink-receptive coating.

* * * * *